United States Patent [19]

Kuwana et al.

[11] Patent Number: 5,116,109
[45] Date of Patent: May 26, 1992

[54] ANTI-SKID CONTROL SYSTEM FOR AN AUTOMOTIVE VEHICLE

[75] Inventors: Kazutaka Kuwana, Toyota; Tsuyoshi Yoshida, Obu; Hiroyuki Ichikawa, Okazaki; Masaru Kamikado, Anjo; Kuniaki Okamoto, Nagoya; Satoshi Itabashi, Toyota, all of Japan

[73] Assignee: Aisin Seiki Kaibshiki Kaisha, Kariya, Japan

[21] Appl. No.: 630,182

[22] Filed: Dec. 19, 1990

[30] Foreign Application Priority Data

Dec. 28, 1989 [JP] Japan ................... 1-342558

[51] Int. Cl.$^5$ .............................................. B60T 8/32
[52] U.S. Cl. .............................. 303/109; 188/181 A; 188/181 C; 303/106; 303/108; 303/110
[58] Field of Search ............... 303/102, 103, 105, 106, 303/107, 108, 109, 100, 110, 95-97; 88/181 C, 181 A; 364/426.02, 426.01, 426.03

[56] References Cited

U.S. PATENT DOCUMENTS 4,912,744  3/1990  Hurst .................. 303/95 X
5,015,041  5/1991  Kuwana et al. .......... 303/95
5,021,957  6/1991  Yoshiho et al. ......... 303/95 X

FOREIGN PATENT DOCUMENTS 48-41173  6/1973  Japan .

Primary Examiner—Douglas C. Butler
Attorney, Agent, or Firm—Burns, Doane, Swecker & Mathis

[57] ABSTRACT

The invention is directed to an anti-skid control system for controlling a braking force applied to a road wheel with a hydraulic braking pressure supplied to a wheel brake cylinder through a pressure control valve controlled by an electronic controller. On the basis of a wheel speed of the road wheel detected by a wheel speed sensor, the controller calculates an estimated vehicle speed and sets a reference speed on the basis thereof. In the controller, the wheel speed is compared with the reference speed, and in response to a result of comparison the hydraulic pressure supplied to the wheel brake cylinder is controlled by the pressure control valve. Through an adjustment by the controller, the hydraulic braking pressure is decreased in response to a change of difference between the wheel speed and the estimated vehicle speed for a certain period of time. The controller may be arranged to calculate an integrated value of the difference between the wheel speed and the estimated vehicle speed, to compare a value which is obtained by subtracting the integrated value from the wheel speed, with the reference speed, and to decrease the hydraulic pressure in the wheel brake cylinder in response to the result of comparison.

10 Claims, 11 Drawing Sheets

ANTI-SKID CONTROL SYSTEM FOR AN AUTOMOTIVE VEHICLE

BACKGROUND OF THE INVENTION

1. Field of the Invention

The present invention relates to an anti-skid control system for use in an automotive vehicle, and more particularly to an anti-skid control system for controlling braking force applied to road wheels in braking operation to prevent the road wheels from being locked.

2. Description of the Prior Art

It is known that the vehicle stability is influenced detrimentally depending upon the road surface condition, when road wheels are locked in abrupt braking operation. In order to prevent the road wheels from being locked, therefore, there has been employed an anti-skid control system which controls the braking force by decreasing or recovering a hydraulic braking pressure supplied to a wheel brake cylinder In general, the anti-skid control system is arranged to detect a rotational speed of each road wheel or a wheel speed, calculate an estimated vehicle speed on the basis of the wheel speed, and calculate a reference speed on the basis of the estimated vehicle speed The system is arranged to compare the wheel speed of each road wheel with the reference speed, and control the hydraulic braking pressure in the wheel brake cylinder mounted on each road wheel, in response to a result of comparison.

The above-described reference speed is provided for setting a threshold level to initiate decreasing the hydraulic braking pressure, and generally set to a value obtained by subtracting a certain speed from a certain rate of the estimated vehicle speed In the anti-skid control method disclosed in Japanese Patent Laid-open Publication No.48-41173, for example, the above-described value corresponds to a set voltage defined as a voltage obtained by subtracting a certain voltage from a certain rate of a voltage corresponding to a wheel speed. The set voltage, or the reference speed is set to such a value as described in the above publication, so as to avoid an erroneous operation which may be caused in a low speed area or the like, if the estimated vehicle speed is directly compared with the wheel speed as a reference speed.

However, in the anti-skid control operation based upon the above-described reference speed, when the hydraulic braking pressure is gradually applied to the wheel brake cylinder, to be slightly higher than the hydraulic pressure for causing a road wheel to be locked, there may exist such a condition that the wheel speed $V_w$ will be less than the estimated vehicle speed $V_s$, but greater than the estimated vehicle speed ($V_s$), so that it will be unable to initiate decreasing the hydraulic braking pressure Accordingly, if the above condition continues, the road wheel will be locked without decreasing the hydraulic braking pressure in the wheel brake cylinder..

Figure 12:
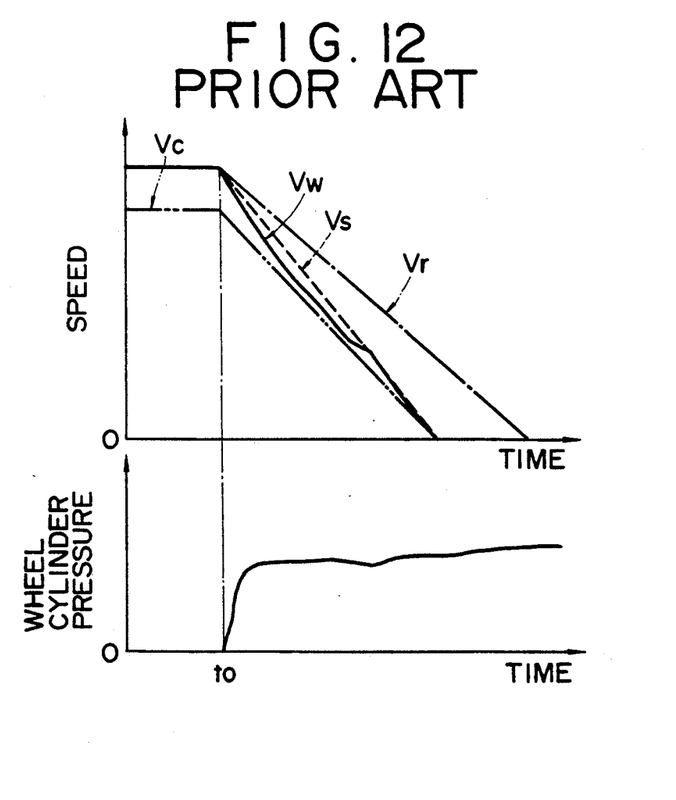
FIG. 12 is a diagram showing the operation of the anti-skid control system in the prior art.

FIG. 12 shows an operation of the prior anti-skid control system in the above condition. In the case where the wheel speed $V_w$ is maintained to be less than the estimated vehicle speed $V_s$, and greater than a reference speed $V_c$ ($=K_5 \cdot V_s - K_6$), the hydraulic braking pressure in the wheel brake cylinder is gradually increased without being decreased, so that the wheel speed $V_w$ is getting remote from the actual vehicle speed $V_r$ to have the road wheel locked. This will possibly happen in the case where the anti-skid operation is performed while the vehicle is running on a road of a low coefficient of friction having a characteristic of a relatively flat $\mu$-S curve which indicates a relationship between the coefficient of friction and the slip rate, especially in the case where the estimated vehicle speed $V_s$ is calculated on the basis of the wheel speed of a single road wheel. As to the values $K_5$, $K_6$ for setting the reference speed $V_c$, the value $K_5$ indicates a certain rate (e.g., 0.95), and the value $K_6$ indicates a certain speed (e.g., 2 km/h).

On the contrary, if the reference speed $V_c$ was set to a greater value to be close to the estimated vehicle speed $V_s$, the problem raised in the above publication could not be solved. Thus, the hydraulic braking pressure in the wheel brake cylinder would be excessively decreased due to a peculiar change in the wheel speed, or the like, so that the braking distance is likely to be extended.

SUMMARY OF THE INVENTION

Accordingly, it is an object of the present invention to provide an anti-skid control system for an automotive vehicle which controls a hydraulic braking pressure in a wheel brake cylinder in response to a result of comparison between a wheel speed and a reference speed calculated on the basis of an estimated vehicle speed, to effectively prevent a road wheel from being locked without causing a braking distance extended due to an excessive decrease of the hydraulic pressure.

In accomplishing the above and other objects, an anti-skid control system for an automotive vehicle which has a wheel brake cylinder mounted on each road wheel for applying a braking force thereto. The anti-skid control system is provided with detection means for detecting a wheel speed of the road wheel, means for calculating an estimated vehicle speed on the basis of the wheel speed, means for setting a primary reference speed on the basis of the estimated vehicle speed, comparison means for comparing the wheel speed with the primary reference speed, pressure control means for controlling a hydraulic braking pressure supplied to the wheel brake cylinder in response to the result of comparison of the comparison means, and adjusting means for decreasing the hydraulic braking pressure in the wheel brake cylinder in response to a change of difference between the wheel speed and the estimated vehicle speed for a certain period of time.

In the above-described anti-skid control system, the adjusting means may be arranged to include means for calculating an integrated value of difference between the wheel speed and the estimated vehicle speed, and the comparison means may be arranged to obtain a first value by subtracting a first rate of the integrated value from the wheel speed, compare the first value with the primary reference speed, and control the pressure control means to decrease the hydraulic braking pressure in the wheel brake cylinder when the first value is less than the primary reference speed.

In the above-described anti-skid control system, the adjusting means may be arranged to include means for counting a duration of such a condition that the wheel speed is less than the estimated vehicle speed continuously, and arranged to control the pressure control means to decrease the hydraulic braking pressure in the wheel brake cylinder when the duration exceeds a predetermined reference time.

In the above-described anti-skid control system, the adjusting means may be arranged to control the pressure control means to decrease the hydraulic braking pressure in the wheel brake cylinder in response to a change of difference between the wheel speed and the estimated vehicle speed for a certain period of time, only at the time of initiation of a control performed by the pressure control means.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
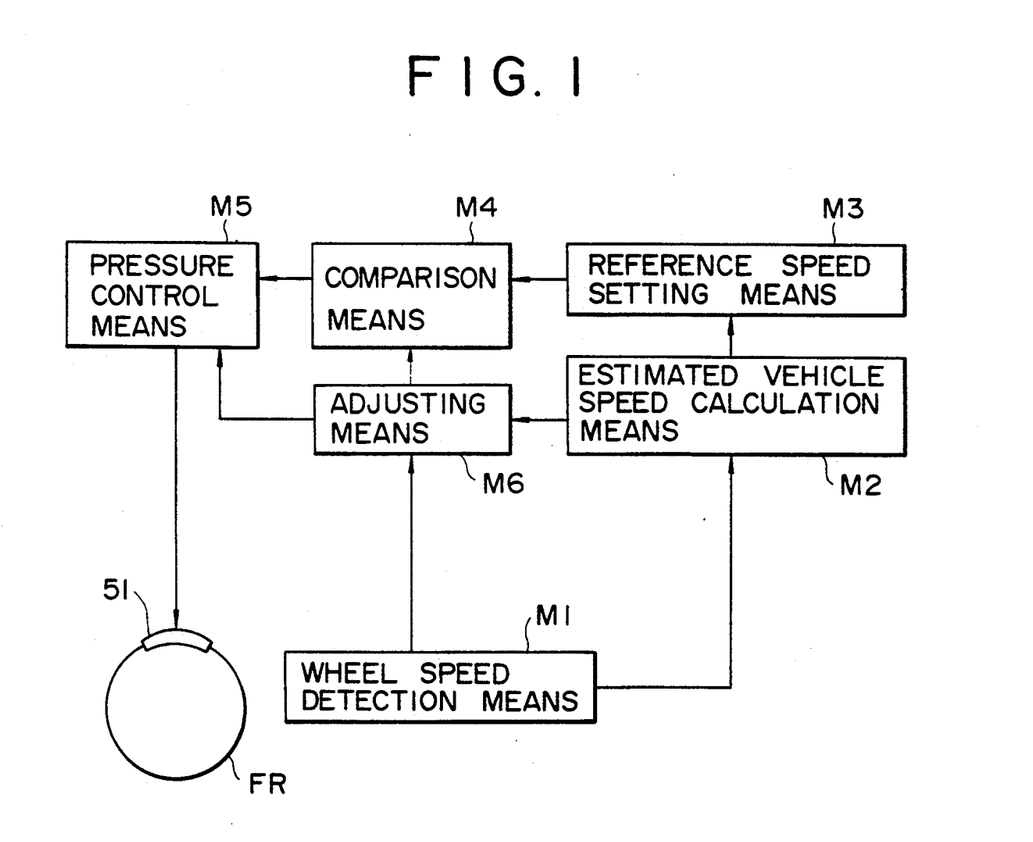
FIG. 1 is a general block diagram illustrating an anti-skid control system according to the present invention.

Referring to FIG. 1, there is schematically illustrated an anti-skid control system according to the present invention which controls a braking force applied to each of front road wheels FR, FL and rear road wheels RR, RL of a vehicle depending upon a braking condition. In FIG. 1, only road wheel FR and wheel brake cylinder 51 mounted thereon have been disclosed for simplicity.

In the anti-skid control system, wheel speed detection means M1 is provided for detecting a wheel speed of the road wheel FR. Estimated vehicle speed calculation means M2 is provided for calculating an estimated vehicle speed of the vehicle on the basis of the wheel speed detected by the wheel speed detection means M1. Reference speed setting means M3 is provided for setting a primary reference speed on the basis of the estimated vehicle speed Comparison means M4 is provided for comparing the wheel speed with the primary reference speed. Pressure control means M5 is provided for controlling a hydraulic braking pressure supplied to the wheel brake cylinder 51 in response to the result of comparison of the comparison means M4. Then, adjusting means M6 is provided for decreasing the hydraulic braking pressure in the wheel brake cylinder 51 in response to a change of difference between the wheel speed and the estimated vehicle speed for a certain period of time. The adjusting means M6 may be arranged to include means for calculating an integrated value of difference between the wheel speed and the estimated vehicle speed, and the comparison means M4 may be arranged to obtain a first value by subtracting a first rate of the integrated value from the wheel speed, compare the first value with the primary reference speed, and control the pressure control means M5 to decrease the hydraulic braking pressure in the wheel brake cylinder 51 when the first value is less than the primary reference speed.

Accordingly, if such a condition that the wheel speed is less than the estimated vehicle speed continues for a certain period of time, the pressure control means M5 is controlled to decrease the hydraulic braking pressure in the wheel brake cylinder 51, so that the road wheel FR is effectively prevented from being locked.

Figure 2:
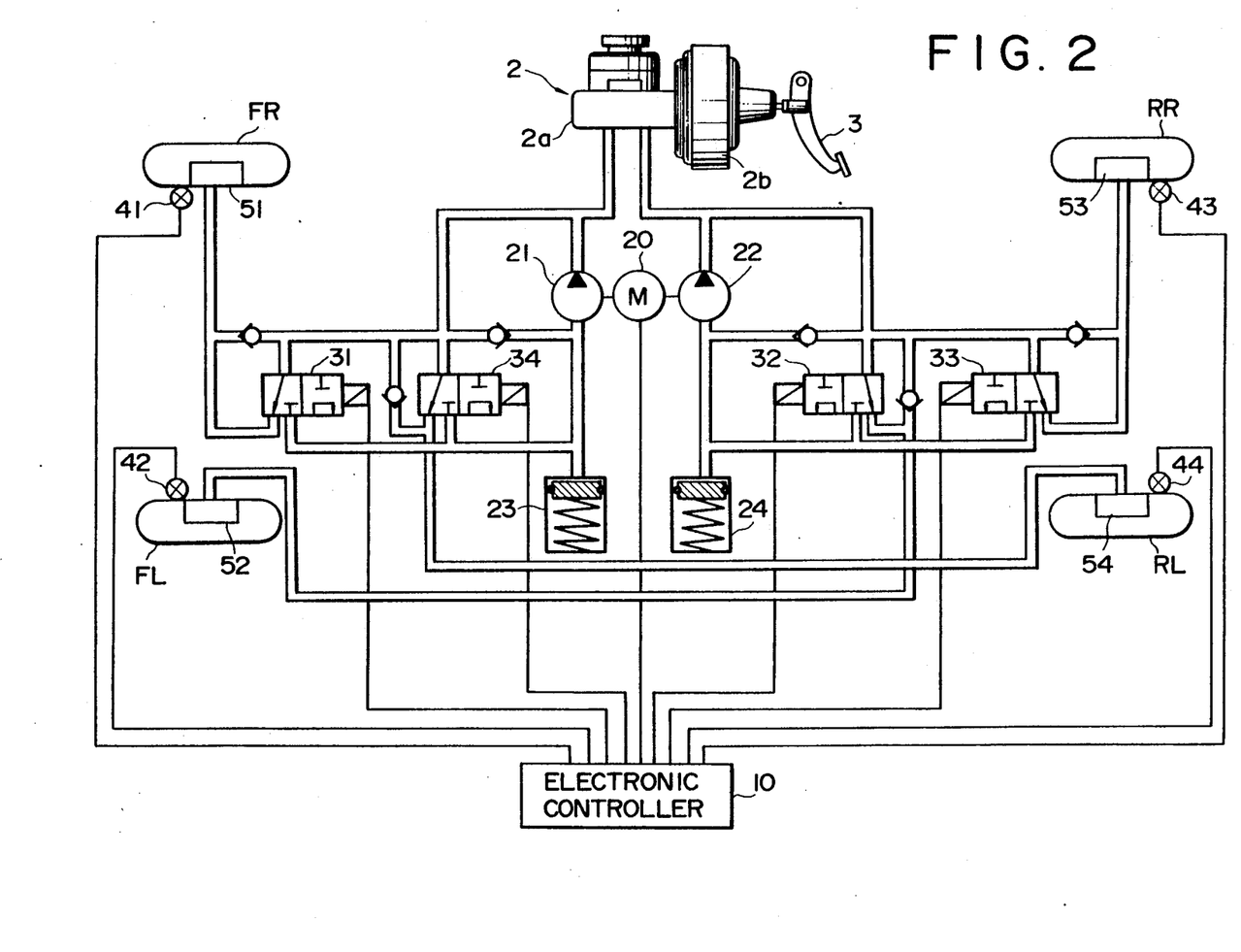
FIG. 2 is a schematic block diagram of an anti-skid control system of an embodiment according to the present invention.

More specifically, an embodiment of the present invention is illustrated in FIGS. 2 to 6. Referring to FIG. 2, pumps 21, 22, reservoir 23, 24 and solenoid valves 31 to 34 are disposed in hydraulic circuits for connecting a hydraulic pressure generator 2 which includes a master cylinder 2a and a booster 2b operated in response to depression of a brake pedal 3, to wheel brake cylinders 51 to 54 mounted on road wheels FR, FL, RR, and RL. The road wheel FR designates a road wheel at the fore right side as viewed from the position of a driver's seat, the road wheel FL designates a road wheel at the fore left side, the road wheel RR designates a road wheel at the rear right side, and the road wheel RL designates a road wheel at the rear left side, and a so-called diagonal circuit is employed as is apparent from FIG. 2.

The solenoid valves 31, 34 are disposed respectively in hydraulic circuits for connecting one output port of the master cylinder 2a to the wheel brake cylinders 51, 54, and the pump 21 is disposed between the master cylinder 2a and the solenoid valves 31, 34. Similarly, the solenoid valves 32, 33 are disposed respectively in hydraulic circuits for connecting the other output port of the master cylinder 2a to the wheel brake cylinders 52, 53, and the pump 22 is disposed between the master cylinder 2a and the solenoid valves 32, 33. The pumps 21, 22 are driven by an electric motor 20, so that brake fluid raised to a predetermined pressure is supplied to these hydraulic circuits. Accordingly, these hydraulic circuits serve as the circuits through which the hydraulic braking pressure is supplied to the solenoid valves 31 to 34. The hydraulic circuits at the drain side of the solenoid valves 31, 34 are connected to the pump 21 through the reservoir 23, and the hydraulic circuits at the drain side of the solenoid valves 32, 33 are connected to the pump 22 through the reservoir 24. Each of the reservoirs 23, 24 is provided with a piston and a spring, and functions so as to store the brake fluid returned from each of the solenoid valves 31 to 34 through the hydraulic circuits at the drain side thereof, and to supply the brake fluid to each of the solenoid valves 31 to 34 when the pumps 21, 22 operate.

Each of the solenoid valves 31 to 34 is a three ports-two positions solenoid operated changeover valve, and is in its first operating position as shown in FIG. 2 when a current is not fed to its solenoid coil, so that each of the wheel brake cylinders 51 to 54 is communicated with the hydraulic pressure generator 2 and the pump 21 or 22. When the current is fed to the solenoid coil, each solenoid valve is changed over to its second operating position, so that each of the wheel brake cylinders 51 to 54 is shut off from the communication with the hydraulic pressure generator 2 and the pump 21 or 22, and is communicated with the reservoir 23 or 24. Check valves shown in FIG. 2 permit the brake fluid to return from each of the wheel brake cylinders 51 to 54 and the reservoirs 23, 24 to the hydraulic pressure generator 2, and blocks the counterflow of the brake fluid.

Accordingly, with each of the solenoid valves 31 to 34 turned on or off, the hydraulic braking pressure in each of the wheel brake cylinders 51 to 54 is decreased or increased. Namely, when the current is not fed to the solenoid coil of each of the solenoid valves 31 to 34, the hydraulic braking pressure is supplied from the hydraulic pressure generator 2 and the pump 21 or 22 to each of the wheel brake cylinders 51 to 54 to increase the hydraulic braking pressure in each wheel brake cylinder On the other hand, when the current is fed to the solenoid coil, each of the wheel brake cylinders 51 to 54 is communicated with the reservoir 23 or 24 to decrease the hydraulic braking pressure in each wheel brake cylinder. As the solenoid valves 31 to 34, there may be employed three ports-three positions solenoid operated valves which provides one of three operating positions for decreasing, recovering (increasing) or holding the hydraulic pressure selectively, or a proportional pressure control solenoid valve which controls the hydraulic pressure in linear proportion to the current fed to the solenoid coil.

The above-described solenoid valves 31 to 34 are connected to the electronic controller 10 which controls the operation of the solenoid valves 31 to 34. The electric motor 20 is also connected to the electronic controller 10, so that the operation of the electric motor 20 is controlled by the electronic controller 10. At the road wheels FR, FL, RR and RL, there are provided wheel speed sensors 41 to 44 respectively, which are connected to the electronic controller 10, and by which a signal corresponding to a rotational speed of each road wheel, i.e., a wheel speed signal is fed to the electronic controller 10. Each of the wheel speed sensors 41 to 44 in the present embodiment is a well known sensor of electromagnetic induction type which comprises a pick-up having a coil wound around a permanent magnet and a rotor having an outer peripheral end thereof provided with teeth, and functions to output a voltage with a frequency proportional to the rotational speed of each road wheel. Further, a Hall IC or a photosensor or the like may be used for the wheel speed sensors 41 to 44, instead of the above-described sensor.

Figure 3:
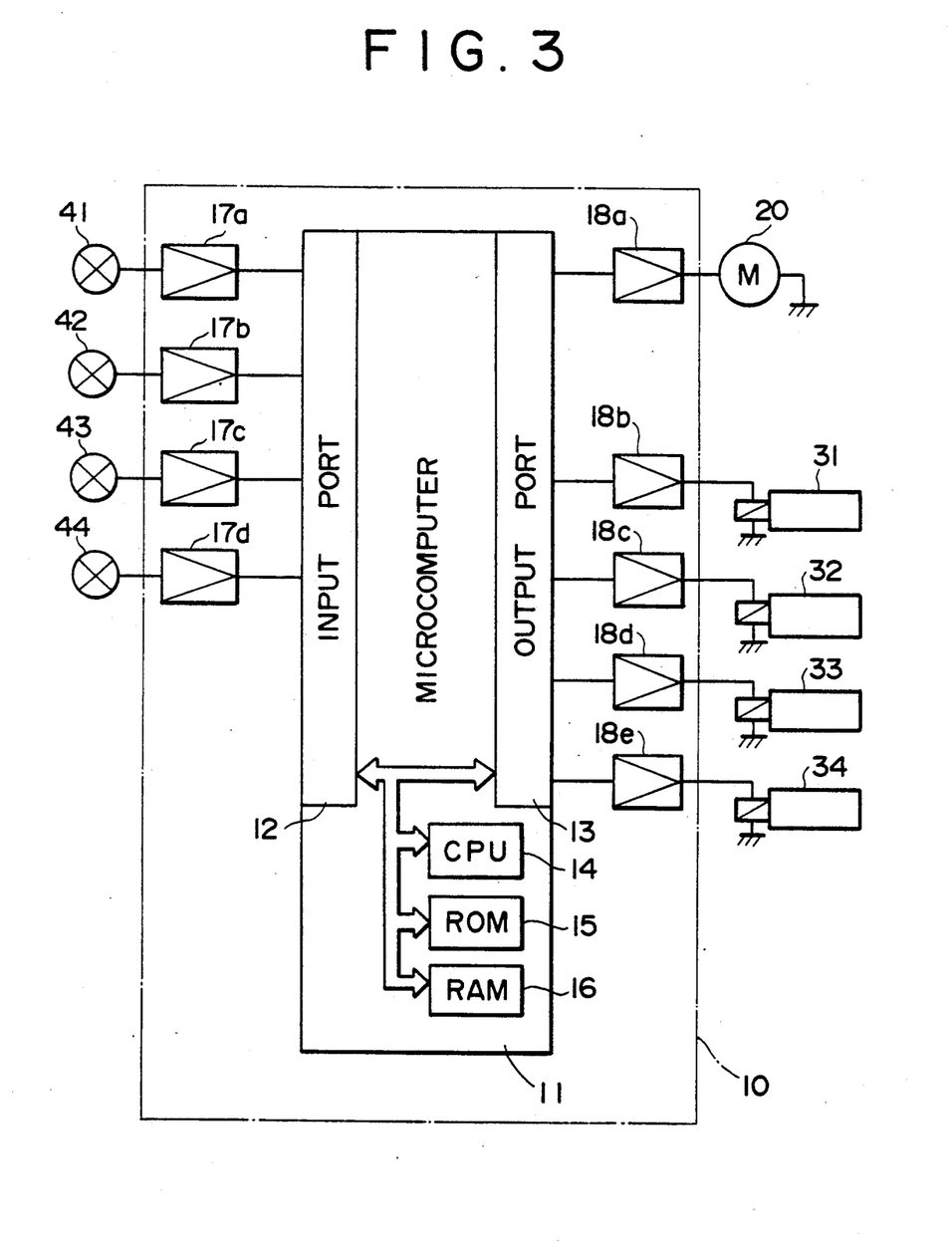
FIG. 3 is a block diagram illustrating the arrangement of an electronic controller as shown in FIG. 2.

As shown in FIG. 3, the electronic controller 10 is provided with a one-chip microcomputer 11, which includes a central processing unit or CPU 14, a read-only memory or ROM 15 and a random access memory or RAM 16, which are connected with an input port 12 and an output port 13 via a common bus to execute the input/output operations relative to external circuits. The signal detected by each of the wheel speed sensors 41 to 44 is fed to the input port 12 via respective amplification circuits 17a to 17d and then to the CPU 14. Then, a control signal is output from the output port 13 to the electric motor 20 via a drive circuit 18a, and control signals are output to the solenoid valves 31 to 34 via the respective drive circuits 18b to 18e.

A program routine executed by the electronic controller 10 for the anti-skid control will now be described with reference to FIGS. 4–7 which are flowcharts showing an operation executed in accordance with a program of one embodiment of the present invention, which program is executed repeatedly at intervals of a predetermined period of time.

Figure 4:
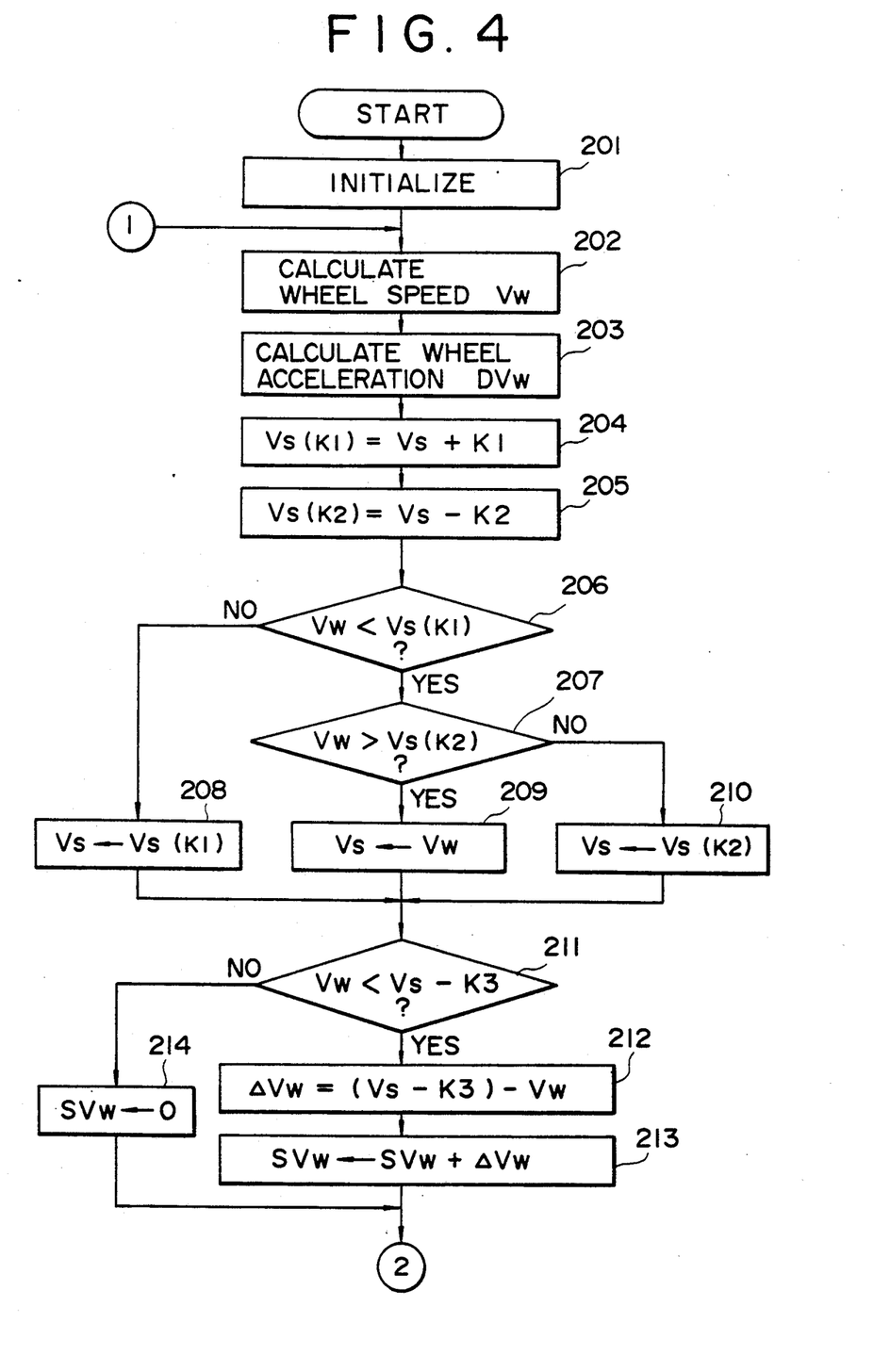
FIGS. 4, 5 and 6 are flowcharts showing the operation of the braking force control according to an embodiment of the present invention.

The program routine provides for initialization of the system at Step 201 where various timers or the like are cleared. Then, the program proceeds to Step 202, where the wheel speed of each of the road wheels is calculated in known fashion on the basis of the output signal from each of the wheel speed sensors 41 to 44. Hereinafter will be used a vehicle speed Vw of the road wheel FR out of the road wheels representing others for simplicity. Next, the wheel acceleration DVw is calculated from the wheel speed Vw at Step 203. The wheel acceleration DVw includes the wheel deceleration which is indicated by a negative value, while the acceleration is indicated by a positive value. The program proceeds further to Steps 204, 205, where a first set speed Vs(K1) and a second set speed Vs(K2) are obtained by adding a certain value K1 to the estimated vehicle speed Vs calculated at the preceding cycle of the routine, and subtracting a certain value K2 therefrom respectively. The certain value K1 corresponds to a speed having 3.0 G (G is the acceleration of gravity) which is the highest value of a vehicle acceleration AVv, whereas the certain value K2 corresponds to a speed having $-1.2$ G which is the lowest value of a vehicle deceleration DVv.

Then, the program proceeds to Step 206 where the wheel speed Vw is compared with the first set speed Vs(K1). If it is determined that the wheel speed Vw is not less than the first set speed Vs(K1), the program proceeds to Step 208 where the estimated vehicle speed Vs is set to the first set speed Vs(K1). If the wheel speed Vw is less than the first set speed Vs(K1), the program proceeds to Step 207 where the wheel speed Vw is compared with the second set speed Vs(K2). If it is determined that the wheel speed Vw is greater than the second set speed Vs(K2), the program proceeds to Step 209 where the estimated vehicle speed Vs is set to the wheel speed Vw. If the wheel speed Vw is not greater than the second set speed Vs(K2), the program proceeds to Step 210 where the estimated vehicle speed Vs is set to the second set speed Vs(K2).

Thereafter, the program proceeds to Step 211 where it determines if the wheel speed Vw is greater than a reference value obtained by subtracting a certain value K3 from the estimated vehicle speed Vs. The certain value K3 is set to a value from 0 km/h to 1 km/h. If the wheel speed Vw is less than the reference value (Vs-K3), the program proceeds to Step 212 where a difference $\Delta$Vw is obtained by subtracting the wheel speed Vw from the reference value (Vs-K3). Then, the program proceeds to Step 213 where an integrated value SVw of the difference $\Delta$Vw is set to a new integrated value SVw by adding thereto the difference $\Delta$Vw, then proceed to Step 215 in FIG. 5. If it is determined at Step 211 that the wheel speed Vw is not less than the reference value (Vs-K3), the program proceeds to Step 214 where the integrated value SVw is set to zero and proceeds further to Step 215.

Figure 5:
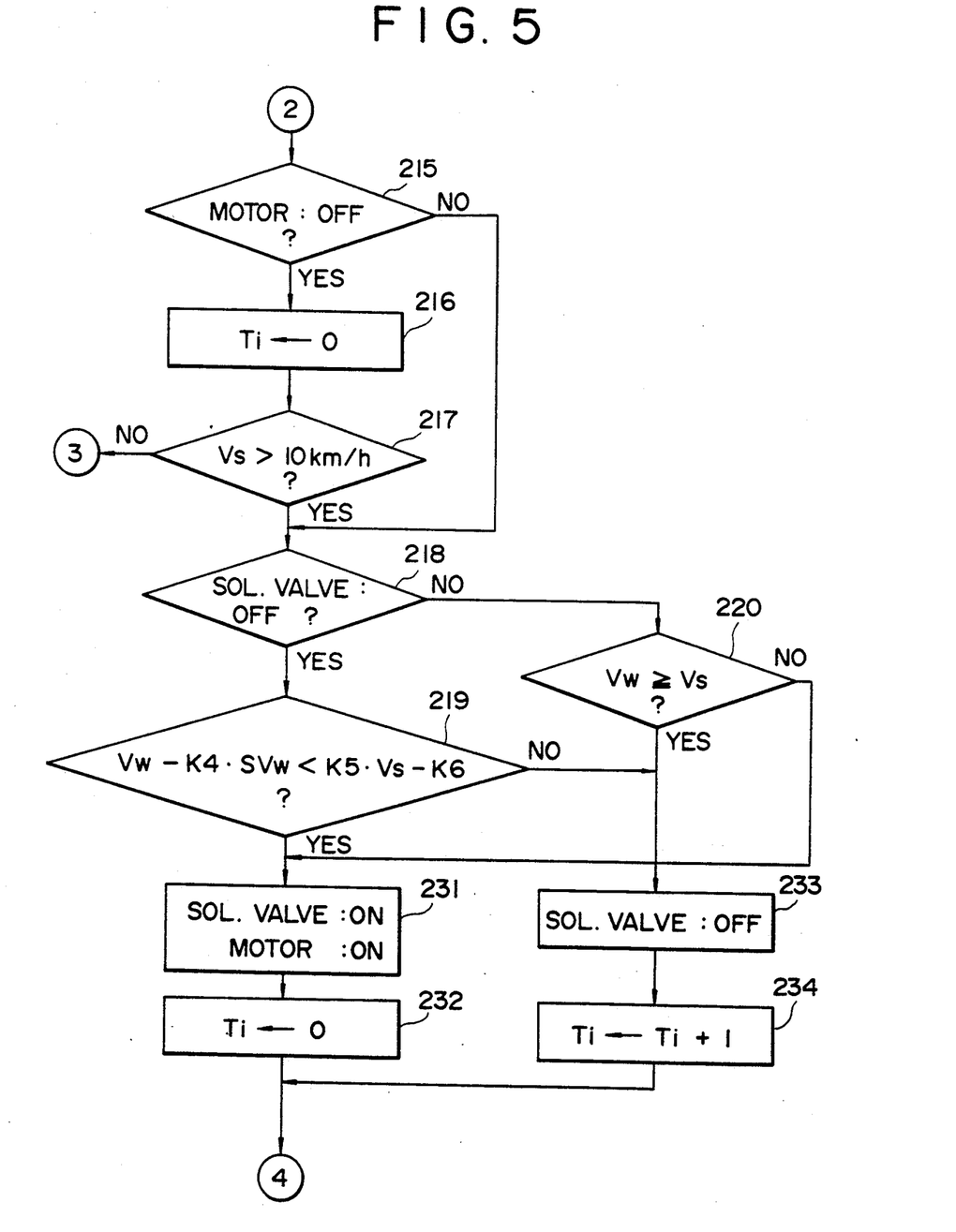

At Step 215 in FIG. 5, it is determined whether or not the motor 20 is in the off condition, i.e., whether or not the anti-skid control has been initiated. If the motor 20 is in the on condition, i.e., if the anti-skid control operation is being performed, the program proceeds to Step 218. If the motor 20 is in the off condition like in the initial condition, the program proceeds to Step 216 where an increase pressure timer Ti which will be described later is reset (to "0"). Then, the program proceed to Step 217 where it is determined if the estimated vehicle speed Vs is greater than a predetermined speed of 10 km/h for determining the initiation of anti-skid control If it is not greater than 10 km/h, the program proceeds to Step 244 in FIG. 6. If the estimated vehicle speed Vs exceeds 10 km/h, the program proceeds to Step 218 where it determines if the solenoid valve 31 is in the off condition, i.e., if the hydraulic braking pressure in the wheel brake cylinder 51 (hereinafter referred to as wheel cylinder pressure) is being recovered (i.e., increased) or decreased. In this respect, it is determined that the wheel cylinder pressure is being recovered, when the solenoid valve 31 is in the off condition as shown in FIG. 2, whereas it is determined that the wheel cylinder pressure is being decreased when the solenoid valve 31 is in the on condition. The relationship between each of the solenoid valves 32 to 34 and each of the wheel brake cylinders 52 to 54 respectively is the same as that described above, the following operation will be performed every wheel brake cylinder.

If it is determined at Step 218 that the wheel cylinder pressure is being recovered with the solenoid valve 31 positioned in the off condition, the program proceeds to Step 219 where a threshold level for determining the initiation of a decrease pressure operation for decreasing the wheel cylinder pressure is provided to determine whether or not the decrease pressure operation will be started while the wheel cylinder pressure is being recovered (increased). At Step 219, a first value obtained by subtracting a first rate of an integrated value $SVw$ ($=K4\cdot SVw$) from the wheel speed $Vw$ is compared with a second value obtained by subtracting a predetermined speed of a value $K6$ from a second rate of the estimated vehicle speed $Vs$ ($=K5\cdot Vs$),i.e., compared with a primary reference speed according to the present invention. In the present embodiment, $K4$ is set to 0.1, $K5$ is set to 0.95 and $K6$ is set to 2.0 km/h for example.

If it is determined that the former first value ($Vw-K4\cdot SVw$) is less than the latter value ($K5\cdot Vs-K6$) or the primary reference speed, the program proceeds to Step 231 where the solenoid valve 31 and motor 20 are turned on to provide the decrease pressure mode, and further proceeds to Step 232 where the increase pressure timer Ti is reset to zero ("0"). If the first value ($Vw-K4\cdot SVw$) is not less than the reference speed ($K5\cdot Vs-K6$), the program proceeds to Step 233 where the solenoid valve 31 is held to be in the off condition to continue the increase pressure operation for recovering the wheel cylinder pressure, and further proceeds to Step 234 where the increase pressure timer Ti is incremented.

Figure 11:
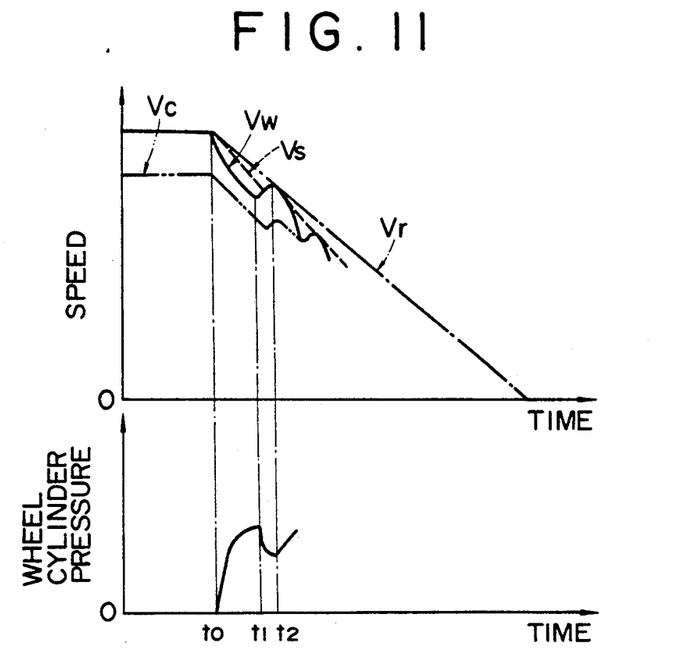
FIG. 11 is a diagram showing the operation of the anti-skid control system according to an embodiment of the present invention.

Thus, the first value for determining the condition for initiating the decrease pressure operation includes the integrated value $SVw$, which is obtained by integrating the difference $\Delta Vw$ while the wheel speed $Vw$ is less than the estimated vehicle speed $Vs$, so that even if the difference $\Delta Vw$ is small, the decrease pressure operation will be initiated after a certain time lapsed, provided that there exist the difference $\Delta Vw$ continuously. Referring to FIG. 11, when the braking operation starts at the time "t0" to increase the wheel cylinder pressure, the wheel speed $Vw$ decreases. Thereafter, the wheel speed $Vw$ continues to be less than the estimated vehicle speed $Vs$ by the difference $\Delta Vw$, so that the integrated value $SVw$ thereof increases. Accordingly, if the first value ($Vw-K4\cdot SVw$) becomes less than the threshold value of the reference speed ($K5\cdot Vs-K6$) as indicated by $Vc$ in FIG. 11, the decrease pressure operation starts at the time "t1" in FIG. 11 to recover the wheel speed $Vw$.

If it is determined at Step 218 that the solenoid valve 31 is in the on condition, the program proceeds to Step 220 where the condition for initiating the increase pressure operation is determined, i.e., it is determined whether or not the increase pressure operation will be initiated while the wheel cylinder pressure is being decreased. Thus, if it is determined that the wheel speed $Vw$ is not less than the estimated vehicle speed $Vs$, the program proceeds to Step 233 where the solenoid valve 31 is turned off to provide the increase pressure mode, and further proceeds to Step 234 where the increase pressure timer Ti is incremented. In FIG. 11, "t2" indicates the time when the increase pressure operation starts, and from when the wheel speed $Vw$ decreases again. If it is determined at Step 220 that the wheel speed $Vw$ is less than the estimated speed $Vs$, the program proceeds to Step 231 where the solenoid valve 31 and motor 20 are held in the on condition to maintain the decrease pressure operation, and further proceeds to Step 232 where the increase pressure timer Ti is cleared.

Figure 6:
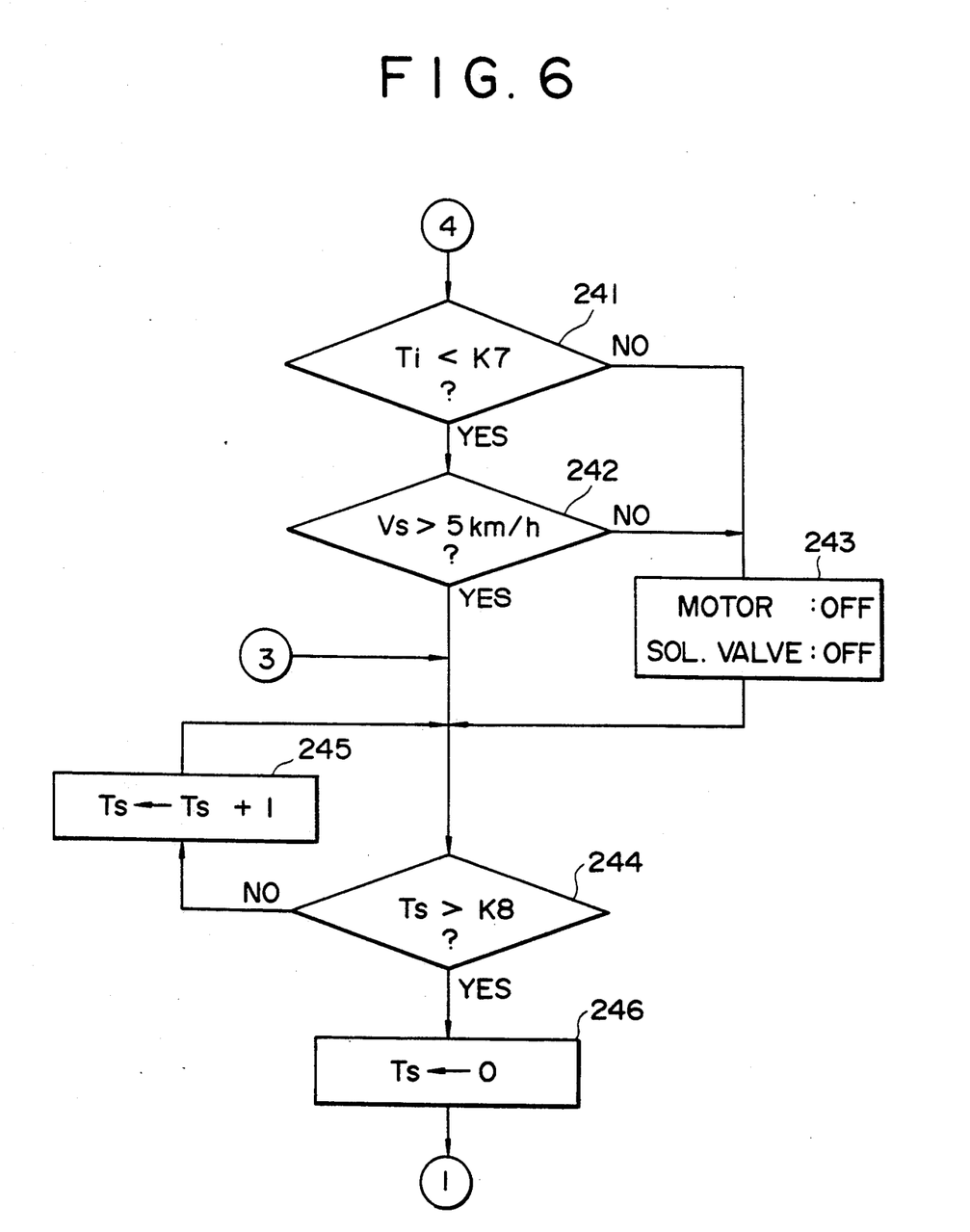

After Step 232 or Step 234 is executed, the program proceeds to Steps 241 and 242 in FIG. 6 where it determines if the anti-skid control is to be finished. Namely, if the increase pressure timer Ti is less than a certain value $K7$ and the estimated vehicle speed $Vs$ exceeds 5 km/h, the program proceeds to Step 244. Whereas, if the increase pressure timer Ti is not less than the value $K7$, or if it is less than the value $K7$ and the estimated vehicle speed $Vs$ is not greater than 5 km/h, the motor 20 and solenoid valve 31 are turned off at Step 243. In the present embodiment, the value $K7$ is set to a value corresponding to one second (1 sec.). Thereafter, at Steps 244 to 246, the operation period of 3 to 5 milliseconds in general is set. That is, if the system timer Ts does not exceed a certain value $K8$ (a value corresponding to 3 to 5 milliseconds), it is incremented at Step 245, and if the time of the value $K8$ elapses, the system timer Ts is cleared at Step 246 and the program returns to Step 202 in FIG. 4. Consequently, the wheel speed $Vw$ is controlled to a value close to an actual vehicle speed $Vr$ so that the road wheel FR is effectively prevented from being locked.

Figure 7:
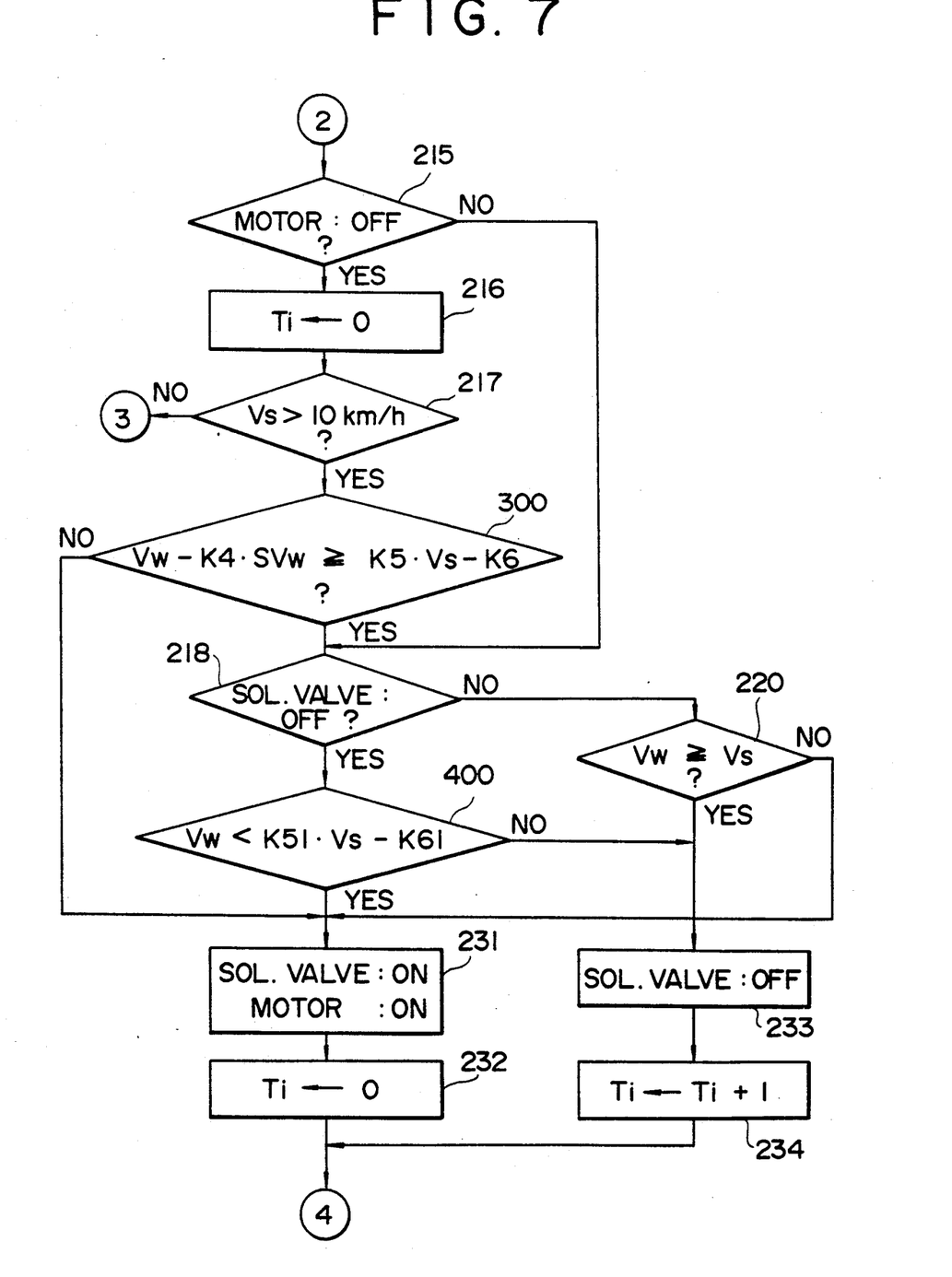
FIGS. 7, 8, 9 and 10 are flowcharts showing the operation of the braking force control according to other embodiments of the present invention.

FIG. 7 shows a flowchart of a routine executed in another embodiment of the present invention, wherein the determination of the condition for initiating the decrease pressure operation, which is executed at Step 219 in FIG. 5, is arranged to be executed only at the time of initiation of a first decrease pressure operation, thereafter the decrease pressure operation is performed according to the ordinary anti-skid control. That is, Step 219 in FIG. 5 is executed prior to Step 218 where if it is determined that the solenoid valve 31 is in the off condition, the determination of the condition for initiating the decrease pressure operation will be made at Step 400 which will be described later. The rest of the routine is the same as that disclosed in the flowchart in FIG. 5.

According to this embodiment, if it is determined that the anti-skid control should be initiated, the condition for initiating the decrease pressure operation is determined at Step 300 as executed at Step 219 in FIG. 5. If it is determined that the decrease pressure operation should be initiated, the program proceeds to Step 231 where the wheel cylinder pressure is decreased. If not, the program proceeds to Step 218 where the condition of the solenoid valve 31 is determined. If it is determined that the solenoid valve 31 is in the off condition, the program proceeds to Step 400 where the wheel speed $Vw$ is compared with a first supplemental reference speed (hereinafter, referred to first reference speed) of the value ($K51\cdot Vs-K61$) calculated on the basis of the estimated vehicle speed $Vs$. If the wheel speed Vw is not less than the first reference speed, the program proceeds to Step 233 where the solenoid valve 31 is maintained to be in the off condition, whereas if the wheel speed Vw is less than the first reference speed, the program proceeds to Step 231 where the decrease pressure operation is performed. Certain values K51, K61 used for calculating the first reference speed may be the same values as the values K5, K6 used at Steps 219, 300 respectively, or may be slightly different therefrom in accordance with a desired control condition. In the present embodiment, K51 is set to 0.95 and K61 is set to 4.0 km/h. Then, after the initiation of the decrease pressure control, the program proceeds to Step 218 without Step 300 executed, since it is determined at Step 215 that the motor 20 is in the on condition.

Figure 8:
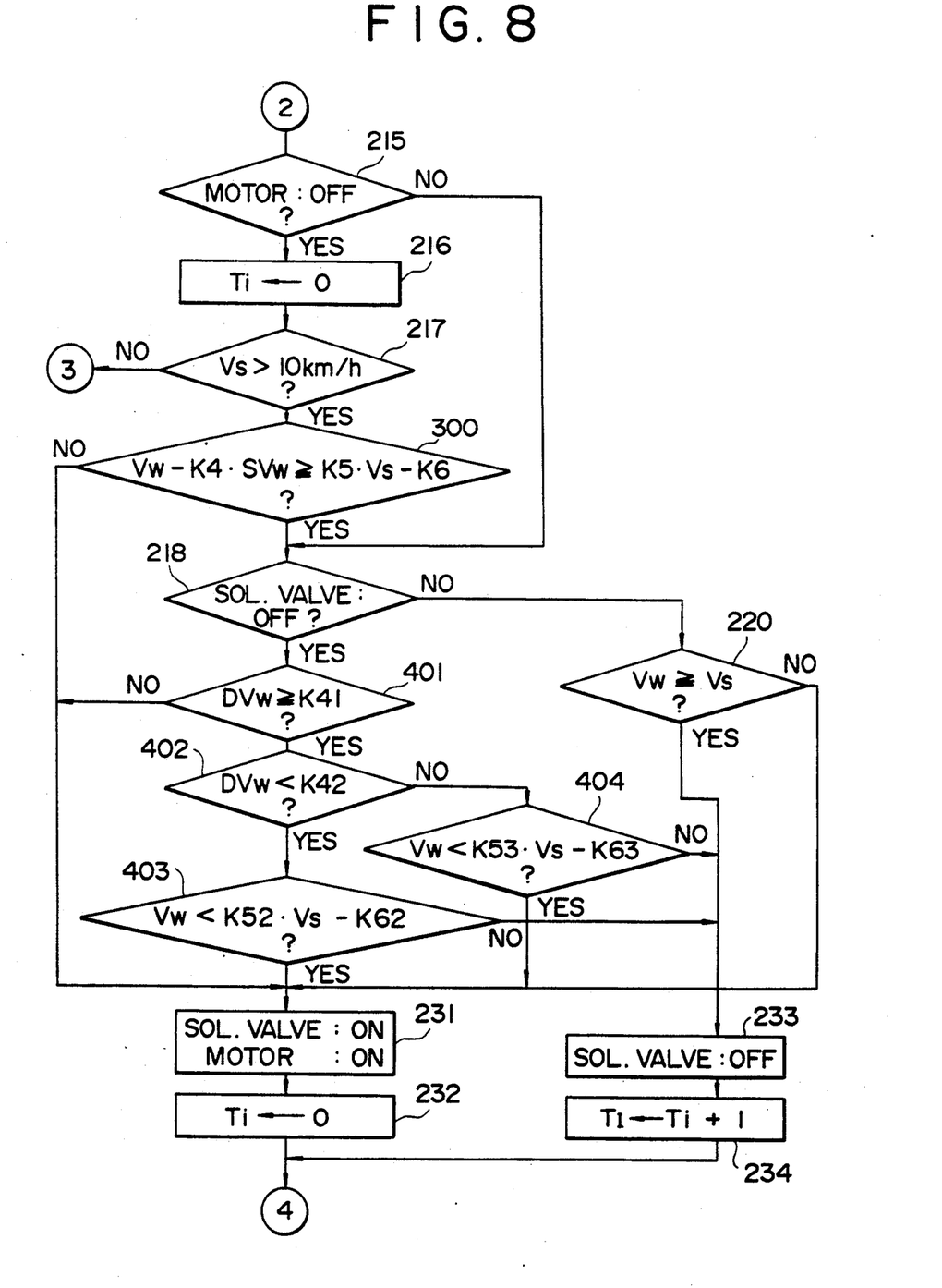

FIG. 8 shows a flowchart of a routine executed in a further embodiment of the present invention, wherein Steps 401 to 404 are substituted for Step 400 in FIG. 7 and the remaining Steps are the same as those defined in FIG. 7. At Step 401, the wheel acceleration DVw is compared with a certain value K41 or a first reference acceleration. If it is determined that the wheel acceleration DVw is less than the value K41, the program proceeds to Step 231 where the decrease pressure operation is performed, whereas if the wheel acceleration DVw is not less than the value K41, the program proceeds to Step 402 where the wheel acceleration DVw is compared with a certain value K42 or a second reference acceleration. For example, the value K41 is set to $-6G$ (G is an acceleration of gravity), and the value K42 is set to $-1.5G$, so that the relationship therebetween will be $K41 < K42$ in terms of a value of acceleration. If it is determined at Step 402 that the wheel acceleration DVw is less than the value K42, i.e., if it is determined that the wheel acceleration DVw takes a value between the value K41 and the value K42, the program proceeds to Step 403 where the wheel speed Vw is compared with a second reference speed ($K52 \cdot Vs - K62$) which is calculated on the basis of the estimated vehicle speed Vs. The values K52, K62 are set to provide the second reference speed which is greater than the first reference speed provided by the values K51, K61, and less than the estimated vehicle speed Vs but close thereto, so that a rapid response will be provided for the initiation of the decrease pressure operation. For example, the value K52 is set to 0.97, and the value K62 is set to 1.0 km/h.

If it is determined at Step 402 that the wheel acceleration DVw is not less than the value K42, the program proceeds to Step 404 where the wheel speed Vw is compared with a third reference speed ($K53 \cdot Vs - K63$). If the wheel speed Vw is less than the third reference speed, the program proceeds to Step 231 where the decrease pressure operation is performed, whereas if not, the program proceeds to Step 233 where the solenoid valve 31 is held to be in the off condition. The values K53, K63 are set to provide the third reference speed which is less than the second reference speed provided by the values K52, K62, so that a slow response will be provided for the initiation of the decrease pressure operation. For example, the value K53 is set to 0.96, and K63 is set to 2.0 km/h.

Figure 9:
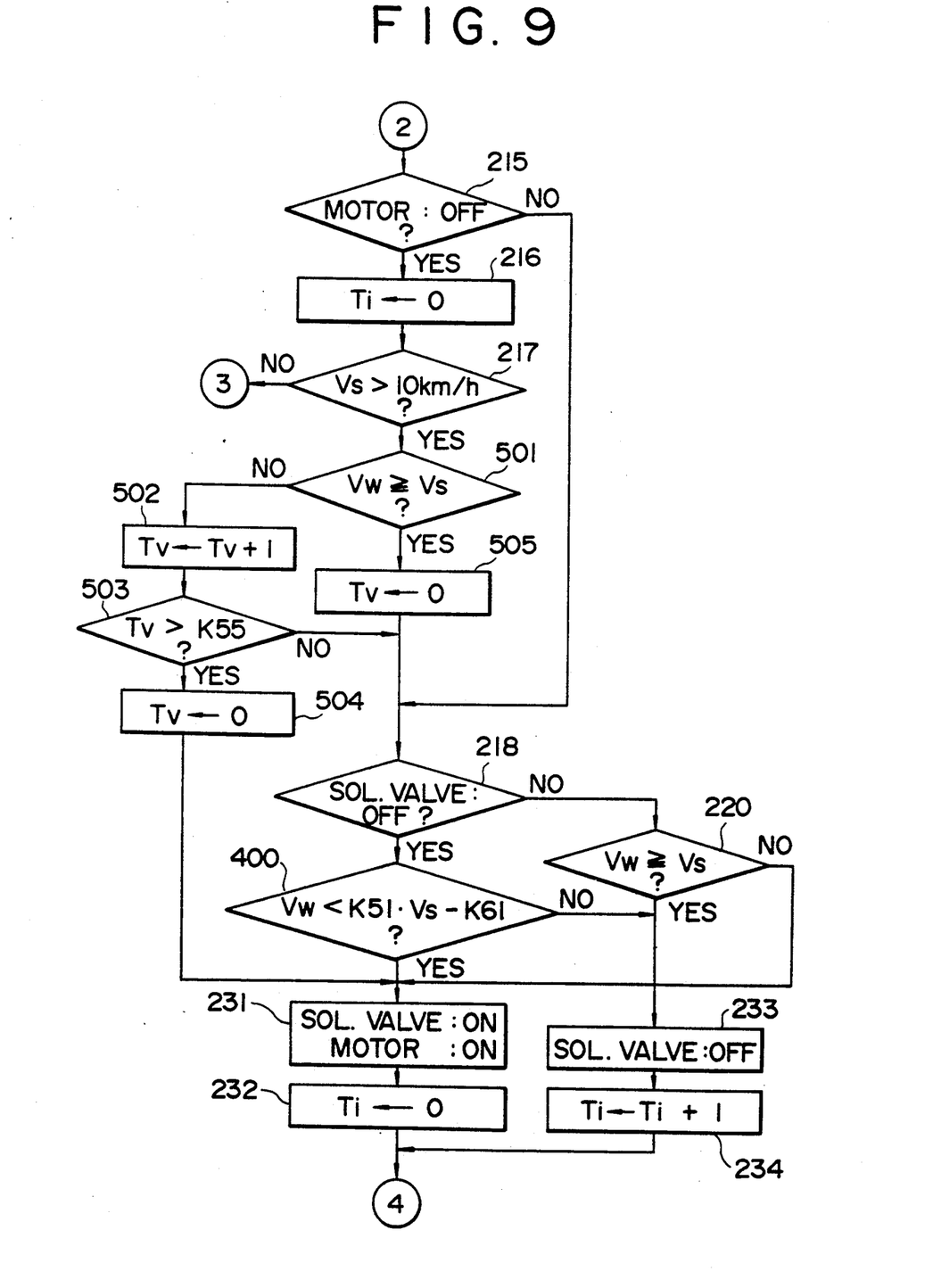

FIG. 9 shows a flowchart of a routine executed in still a further embodiment of the present invention, wherein Steps 501 to 505 are substituted for Step 300 in FIG. 7 and the remaining Steps are the same as those defined in FIG. 7. In contrast with the embodiment in FIG. 7 wherein the integrated value SVw of speed is used, a duration of a certain condition is used in the present embodiment. That is, if such a condition that the wheel speed Vw is less than the estimated vehicle speed Vs continues for a certain period of time, the decrease pressure operation is initiated.

According to the embodiment as shown in FIG. 9, if it is determined at Step 217 that the anti-skid control should be initiated, the program proceeds to Step 501 where the wheel speed Vw is compared with the estimated vehicle speed Vs. If it is determined that the former is not less than the latter, a timer Tv is cleared and the ordinary anti-skid operation will be performed at Steps following Step 218. If it is determined that the wheel speed Vw is less than the estimated vehicle speed Vs, the timer Tv is incremented at Step 502, and the program proceeds to Step 503 where its value is compared with a reference value K55 which corresponds to a predetermined reference time according to the present invention. The reference value K55 is set to a value corresponding to 0.3 seconds. If the value of the timer Tv is not greater than the reference value K55, the program proceeds to Step 218, whereas if it is greater than the reference value K55, the program proceeds to Step 504 where the timer Tv is cleared, and further proceeds to Step 231 where the decrease pressure operation will start An initial value of the timer Tv is set at Step 201 to zero ("0").

Figure 10:
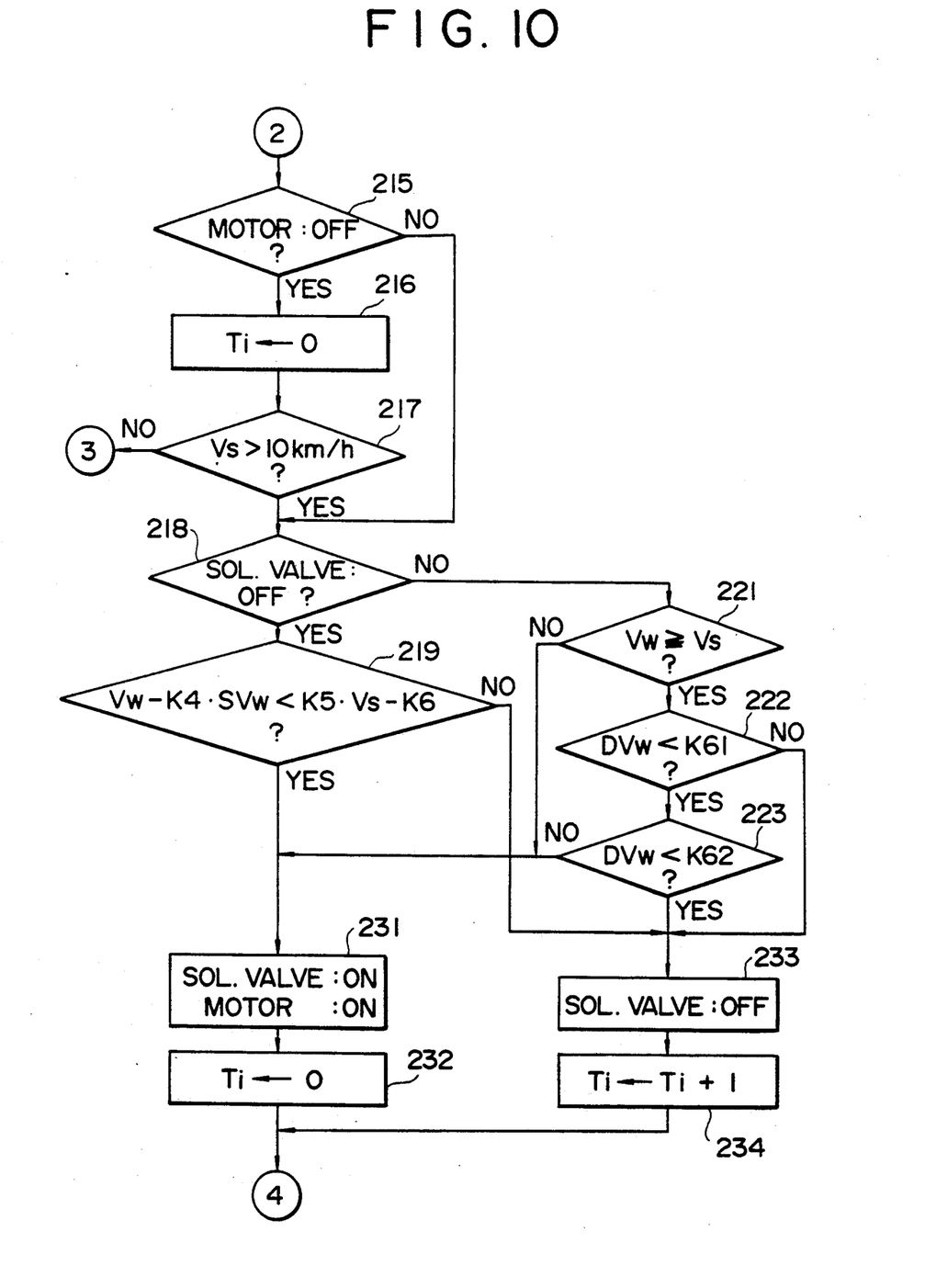

FIG. 10 is a flowchart with Steps which may be substituted for Step 220 in FIG. 5, and may also be substituted for Step 220 in FIGS. 7 to 9. At Step 221, the wheel speed Vw is compared with the estimated vehicle speed Vs. If it is determined that the former is less than the latter, the program proceeds to Step 231 where the decrease pressure operation is continued, whereas if the former is not less than the latter, the program proceeds to Steps 222, 223 where the wheel acceleration DVw is compared with reference values K61, K62. In this embodiment, the reference value K61 is set to 2 G, and the reference value K62 is set to 0.5 G.

If it is determined at Step 222 that the wheel acceleration DVw is not less than the reference value K61, the program proceeds to Step 233 where the increase pressure operation for recovering the wheel cylinder pressure is performed. If it is determined that the wheel acceleration DVw is less than the reference value K61, the program proceeds to Step 223 where it is compared with the reference value K62. Then, if the wheel acceleration DVw is less than the reference value K62, the program proceeds to Step 233 where the increase pressure operation is performed, whereas if it is not less than the value K62, the program proceeds to Step 231 where the decrease pressure operation is continued. That is, even if the wheel speed Vw has exceeded the estimated vehicle speed Vs, the increase pressure operation is not immediately initiated, but the decrease pressure operation is continued, provided that the wheel acceleration DVw is in a range between the reference values K62 and K61. Consequently, the wheel speed Vw in this embodiment is recovered rapidly, in contrast with the embodiments as shown in FIGS. 5, 7, 8 and 9.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for an automotive vehicle having a wheel brake cylinder mounted on each road wheel for applying a braking force thereto, comprising:
   detection means for detecting wheel speed of said each road wheel;
   means for calculating an estimated vehicle speed on the basis of said wheel speed;
   means for setting a primary reference speed on the basis of said estimated vehicle speed;
   comparison means for comparing said wheel speed with said primary reference speed;
   pressure control means for controlling a hydraulic braking pressure supplied to said wheel brake cylinder in response to a result of said comparison means; and
   adjusting means for controlling said pressure control means to decrease said hydraulic braking pressure in said wheel brake cylinder in response to a change of difference between said wheel speed and said estimated vehicle speed for a predetermined period of time.

2. An anti-skid control system for an automotive vehicle as set forth in claim 1, wherein said adjusting means includes means for calculating an integrated value of difference between said wheel speed and said estimated vehicle speed, and wherein said comparison means is arranged to obtain a first value by subtracting a first rate of said integrated value from said wheel speed, compare said first value with said primary reference speed, and control said pressure control means to decrease said hydraulic braking pressure in said wheel brake cylinder when said first value is less than said primary reference speed.

3. An anti-skid control system for an automotive vehicle as set forth in claim 2, wherein said means for setting said primary reference speed is arranged to set said primary reference speed to a second value obtained by subtracting a predetermined speed from a second rate of said estimated vehicle speed.

4. An anti-skid control system for an automotive vehicle as set forth in claim 3, wherein said pressure control means is arranged to increase said hydraulic braking pressure in said wheel brake cylinder when said wheel speed exceeds said estimated vehicle speed.

5. An anti-skid control system for an automotive vehicle as set forth in claim 1, wherein said adjusting means includes means for counting a duration of a condition in which said wheel speed is less than said estimated vehicle speed continuously, and wherein said adjusting means is arranged to control said pressure control means to decrease said hydraulic braking pressure in said wheel brake cylinder when said duration exceeds a predetermined reference time.

6. An anti-skid control system for an automotive vehicle as set forth in claim 5, wherein said adjusting means includes a timer which is set when said wheel speed falls below said estimated vehicle speed and which is reset when said wheel speed exceeds said estimated vehicle speed and when said timer counts said predetermined reference time.

7. An anti-skid control system for an automotive vehicle as set forth in claim 1, wherein said adjusting means is arranged to control said pressure control means to decrease said hydraulic braking pressure in said wheel brake cylinder in response to said change of difference between said wheel speed and said estimated vehicle speed for said predetermined period of time, only at a time of initiation of a control performed by said pressure control means.

8. An anti-skid control system for an automotive vehicle as set forth in claim 1, further comprising means for calculating wheel acceleration based on said wheel speed detected by said detection means.

9. An anti-skid control system for an automotive vehicle as set forth in claim 8, wherein said adjusting means is arranged to control said pressure control means to decrease said hydraulic braking pressure in said wheel brake cylinder in response to said change of difference between said wheel speed and said estimated vehicle speed for said predetermined period of time, only at a time of initiation of a control performed by said pressure control means, and wherein said pressure control means is arranged to decrease said hydraulic braking pressure when said wheel acceleration is between a first reference acceleration and a second reference acceleration greater than said first reference acceleration and said wheel speed is less than a second reference speed which is greater than said primary reference speed and less than said estimated vehicle speed, when said wheel acceleration is greater than said second reference speed and said wheel speed is less than a third reference speed which is less than said second reference speed, and when said wheel acceleration is less than a first reference acceleration.

10. An anti-skid control system for an automotive vehicle as set forth in claim 8, wherein said pressure control mean sis arranged to increase said hydraulic braking pressure in said wheel brake cylinder when said wheel speed exceeds said estimated vehicle speed and said wheel acceleration is out of a predetermined range thereof.

* * * * *